(12) United States Patent
Senzaki et al.

(10) Patent No.: US 11,041,086 B2
(45) Date of Patent: Jun. 22, 2021

(54) HYDROPHILIC TREATMENT METHOD AND SURFACE TREATMENT LIQUID

(71) Applicant: Tokyo Ohka Kogyo Co., Ltd., Kanagawa (JP)

(72) Inventors: Takahiro Senzaki, Kanagawa (JP); Takashi Kamizono, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 16/503,769

(22) Filed: Jul. 5, 2019

(65) Prior Publication Data
US 2020/0017707 A1    Jan. 16, 2020

(30) Foreign Application Priority Data

Jul. 10, 2018 (JP) .............................. JP2018-131058

(51) Int. Cl.
*C09D 133/14* (2006.01)
*B05D 3/00* (2006.01)
*B05D 1/00* (2006.01)

(52) U.S. Cl.
CPC ............. *C09D 133/14* (2013.01); *B05D 1/00* (2013.01); *B05D 3/007* (2013.01); *B05D 2518/10* (2013.01)

(58) Field of Classification Search
CPC .................................................. C09D 133/14
See application file for complete search history.

(56) References Cited

U.S. PATENT DOCUMENTS

2009/0263605 A1* 10/2009 Hoshi ..................... C09J 7/29
428/40.4
2017/0088683 A1* 3/2017 Senzaki ............... C09D 125/18

FOREIGN PATENT DOCUMENTS

JP          5437523         3/2014
KR    10-2017-0103296      9/2017

OTHER PUBLICATIONS

Compound Summary Fluorosulfonic acid. PubChem. http://pubchem.nvbi.nlm.nih.gov/compound/Fluorosulfonic-acid. Created Mar. 26, 2005. Modified on May 16, 2020. (Year: 2020).*
Compound Summary Water. PubChem. http://pubchem.ncbi.nlm.nih.gov/compound/Water. Created Sep. 16, 2004. Modified on May 16, 2020. (Year: 2020).*
Compound Summary (3-Mercaptopropyl)trimethoxysilane. http://pubchem.ncbi.nlm.gov/compound/3-mercaptopropyl_trimethoxysline. Created Mar. 27, 2005. Modified on May 16, 2020. (Year: 2020).*
Extended European Search Report dated Dec. 10, 2019 in European Patent Application No. 19185392.8.

* cited by examiner

*Primary Examiner* — Dah-Wei D. Yuan
*Assistant Examiner* — Kristen A Degenais-Englehart
(74) *Attorney, Agent, or Firm* — Wenderoth, Lind & Ponack, L.L.P.

(57) ABSTRACT

An object is to provide a hydrophilic treatment method which can firmly bond, while coating the surface of a treatment target with an extremely thin film, the coating to the surface of the treatment target and a surface treatment liquid which can be suitably used in the hydrophilic treatment method. In a hydrophilic treatment method using a surface treatment liquid containing a resin (A) and a solvent (S), the surface treatment liquid which includes, as the resin (A), a constituent unit (a1) derived from an N-substituted (meth) acrylamide having a hydrophilic group, which contains, in at least one of molecular chain terminals, a resin including a reactive silyl group and pH of the liquid is 4 or less is used, and thus a coating is formed on the surface of a treatment target.

7 Claims, No Drawings

HYDROPHILIC TREATMENT METHOD AND SURFACE TREATMENT LIQUID

This application is based on and claims the benefit of Priority from Japanese Patent Application No. 2018-131058, filed on 10 Jul. 2018, the content of which is incorporated herein by reference.

BACKGROUND OF THE INVENTION

Field of the Invention

The present invention relates to a hydrophilic treatment method and a surface treatment liquid which is suitably used in the hydrophilic treatment method.

Related Art

Conventionally, in order to modify the properties of surfaces of various articles, various surface treatment liquids are used to perform hydrophilic treatment. In surface modification, there is a great demand for making the surfaces of articles hydrophilic, and thus a large number of hydrophilic treatment methods with various agents and surface treatment liquids for making the surfaces hydrophilic have been proposed.

As the hydrophilic treatment method described above, for example, a method has been proposed that uses a surface adjustment agent containing a copolymer in which at least an acrylamide monomer and a mono(meth)acrylate monomer containing a siloxy group of a specific skeleton are copolymerized and the weight-average molecular weight of the copolymer is 1500 to 50000 (Patent Document 1). By the method disclosed in Patent Document 1, hydrophilicity and stain resistance can be provided to the surface of a treatment target.

Patent Document 1: Japanese Patent No. 5437523

SUMMARY OF THE INVENTION

Incidentally, the target of surface treatment is often an article, such as a microchannel device, in which projections and recesses having dimensions of about several nanometers to several tens of micrometers are provided on its surface. Disadvantageously, however, when such an article is subjected to surface treatment using the surface adjustment agent disclosed in Patent Document 1, fine concave portions may be embedded by the copolymer or the dimensions of the fine concave portions may be significantly narrowed.

For example, after surface treatment, the treated surface is rinsed with an organic solvent, and thus it is possible to greatly reduce the thickness of a film formed of a copolymer. Disadvantageously, however, in this case, since the extremely thin film formed of the copolymer is easily separated, the effect of the surface treatment is easily removed.

The present invention is made in view of the problems described above, and an object thereof is to provide a hydrophilic treatment method which can firmly bond, while coating the surface of a treatment target with an extremely thin film, the coating to the surface of the treatment target and a surface treatment liquid which can be suitably used in the hydrophilic treatment method.

The present inventors, have found that it is possible to solve the problems described above by forming, in a hydrophilic treatment method using a surface treatment liquid containing a resin (A) and a solvent (S), a coating on the surface of a treatment target with the surface treatment liquid which includes, as the resin (A), a constituent unit (a1) derived from an N-substituted (meth) acrylamide having a hydrophilic group, which contains, in at least one of molecular chain terminals, a resin including a reactive silyl group and pH of the liquid is 4 or less, and thereby have completed the present invention. More specifically, the present invention provides the following.

A first aspect of the present invention is a hydrophilic treatment method of using a surface treatment liquid comprising a resin (A) and a solvent (S) to make the surface of a treatment target hydrophilic, the hydrophilic treatment method including: forming a coating film by coating the surface of the treatment target with the surface treatment liquid; and forming a coating having a film thickness of 10 nm or less on the surface of the treatment target by rinsing the coating film with a rinse liquid, wherein the resin (A) comprises a constituent unit (a1) derived from an N-substituted (meth) acrylamide having a hydrophilic group, in at least one of the molecular chain terminals (or ends) of the resin (A), a terminal group (or an end group) which comprises a silanol group and/or a reactive silyl group having a group to generate a silanol group by hydrolysis is bonded, and the pH of the surface treatment liquid is 4 or less.

A second aspect of the present invention is a hydrophilic treatment method of using a surface treatment liquid comprising a resin (A) and a solvent (S) to make the surface of a treatment target hydrophilic, the hydrophilic treatment method including: forming a coating film by coating the surface of the treatment target with the surface treatment liquid; and forming a coating on the surface of the treatment target by rinsing the coating film with a rinse liquid, wherein the resin (A) includes a constituent unit (a1) derived from an N-substituted (meth) acrylamide having a hydrophilic group and a constituent unit (a2) derived from a (meth) acrylamide, in at least one of the molecular chain terminals of the resin (A), a terminal group which comprises a silanol group and/or a reactive silyl group having a group to generate a silanol group by hydrolysis is bonded, a ratio of the constituent unit (a1) to all of the constituent units of the resin is 50 mol % or more and 99 mol % or less, and a ratio of the constituent unit (a2) to all of the constituent units of the resin (A) is 1 mol % or more and 20 mol % or less, and the pH of the surface treatment liquid is 4 or less.

A third aspect of the present invention is the surface treatment liquid used in the hydrophilic treatment method according to the first aspect, wherein the surface treatment liquid comprises the resin (A) and the solvent (S), the resin (A) comprises the constituent unit (a1) derived from the N-substituted (meth) acrylamide having the hydrophilic group, in at least one of the molecular chain terminals of the resin (A), the terminal group which comprises the silanol group and/or the reactive silyl group having the group to generate the silanol group by hydrolysis is bonded, and the pH is 4 or less.

A fourth aspect of the present invention is a surface treatment liquid containing a resin (A) and a solvent (S), the resin (A) includes a constituent unit (a1) derived from an N-substituted (meth) acrylamide having a hydrophilic group and a constituent unit (a2) derived from a (meth) acrylamide, in at least one of the molecular chain terminals of the resin (A), a terminal group which includes a silanol group and/or a reactive silyl group having a group to generate a silanol group by hydrolysis is bonded, a ratio of the constituent unit (a1) to all of the constituent units of the resin (A) is 50 mol % or more and 99 mol % or less, and a ratio of the constituent unit (a2) to all of the constituent units of the resin (A) is 1 mol % or more and 20 mol % or less, and the pH thereof is 4 or less.

The present invention is made in view of the problems described above, and it can provide a hydrophilic treatment method which can firmly bond, while coating the surface of a treatment target with an extremely thin film, the coating to the surface of the treatment target and a surface treatment liquid which can be suitably used in the hydrophilic treatment method.

DETAILED DESCRIPTION OF THE INVENTION

<<Hydrophilic Treatment Method According to First Aspect>>

A hydrophilic treatment method is a method of using a surface treatment liquid containing a resin (A) and a solvent (S) so as to make the surface of a treatment target hydrophilic. The hydrophilic treatment method includes: forming a coating film by coating the surface of the treatment target with the surface treatment liquid; and forming a coating having a film thickness of 10 nm or less on the surface of the treatment target by rinsing the coating film with a rinse liquid.

The resin (A) contained in the surface treatment liquid may include a constituent unit (a1) derived from an N-substituted (meth) acrylamide having a hydrophilic group and may include a constituent unit (a2) derived from a (meth) acrylamide. In at least one of the molecular chain terminals of the resin (A), a terminal group which includes a silanol group and/or a reactive silyl group having a group to generate a silanol group by hydrolysis is bonded. The pH of the surface treatment liquid is 4 or less.

When the resin (A) described above is used, the resin (A) can be covalently bonded to the surface of the treatment target by the reactive silyl group at the terminal. Hence, the extremely thin coating formed in the hydrophilic treatment method described above is firmly bonded to the surface of the treatment target. The resin (A) includes the constituent unit (a1) derived from the N-substituted (meth) acrylamide having the hydrophilic group, and thus a hydrogen bond is formed between a carbonyl group in an amide bond and an amino group (—NH—), In this way, between a plurality of molecular chains in the resin (A), a reticulated network by hydrogen bonds is formed. By the formation of the network by hydrogen bonds, the mechanical strength of the coating itself is enhanced, and covalent bonds formed between the coating and the treatment target are unlikely to be attacked by water and various chemical species, with the result that it can, be considered that even when the coating on the surface of the treatment target receives friction or the like, the hydrophilicity is unlikely to be lowered by the separation of the coating.

The pH of the surface treatment liquid is 4 or less. The pH of the surface treatment liquid is 4 or less, and thus the resin (A) described above is satisfactorily and easily dissolved in, the surface treatment liquid, with the result that the surface treatment liquid is easily stabilized over time. The pH of the surface treatment liquid is preferably 1 or more and 3 or less and is more preferably 1 or more and 2.5 or less. As the pH of the surface treatment liquid, a value which is measured at 20° C. is adopted.

In the following discussion, the applying of the surface treatment liquid to the surface of the treatment target so as to form the coating film is also referred to as the "coating step." The rinsing of the coating film with the rinse liquid to form the coating having a film thickness of 10 nm or less on the surface of the treatment target is also referred to as the "rinse step." In the following discussion, the coating step, the rinse step, and the surface treatment liquid will be described in detail.

<Coating Step>

In the coating step, the surface treatment liquid which satisfies the predetermined requirements described above is applied to the surface of the treatment target so as to form the coating film, A coating method is not particularly limited. Specific examples of the coating method include a spin coat method, a spray method, a roller coat method, an immersion method, and the like. When the treatment target is a substrate, since the coating film having a uniform film thickness is evenly and easily formed on the surface of the substrate, the spin coat method is preferable as the coating method.

The material of the surface of the treatment target to which the surface treatment liquid is applied is not particularly limited and may be either an organic material or an inorganic material, Examples of the organic material include various resin materials such as polyester resins such as a PET resin and a PBT resin, various types of nylons, a polyimide resin, a polyamide-imide resin, polyolefins such as polyethylene and polypropylene, polystyrene, a (meth) acrylic resin, a cycloolefin polymer (COP), a cycloolefin copolymer (COC), and a silicone resin (for example, polyorganosiloxanes such as polydimethylsiloxane (PDMS). Photosensitive resin ingredients contained in various resist materials and alkali-soluble resin ingredients are also preferred as the organic material, Examples of the inorganic material include glass, silicon, and various metals such as copper, aluminum, iron, and tungsten. The metals may be alloys.

Typically, the resin (A) contained in the surface treatment liquid is often bonded by the reactive silyl group to a hydroxyl group on the surface of the treatment target. Hence, before the formation of the coating film, in order to facilitate the satisfactory formation of a covalent bond between the resin (A) and the surface of the treatment target, treatment for introducing a hydroxyl group into the surface of the treatment target may be performed. As a suitable example of the treatment described above, plasma treatment with oxygen plasma, water vapor plasma, or the like is mentioned.

The shape of the treatment target is not particularly limited. The treatment target may be a flat substrate or may have, for example, a three-dimensional shape such as a spherical shape or a columnar shape. The surface of the treatment target may be smooth or may have regular or irregular projections and recesses. As the treatment target having regular or irregular projections and recesses, for example, a microchannel device is mentioned.

After the application of the surface treatment liquid to the surface of the treatment target by a known drying method, as necessary, at least part of the solvent may be removed from the coating film formed of the surface treatment liquid.

The film thickness of the coating film formed in the coating step is not particularly limited as long as the film thickness of the coating formed after the rinse step is 10 nm or less.

<Rinse Step>

In the rinse step, the coating film is rinsed with the rinse liquid, and thus the coating having a film thickness of 10 nm or less is formed on the surface of the treatment target. The rinse liquid is not particularly limited as long as the coating having a desired film thickness can be formed. As the rinse liquid, water, an organic solvent, and an aqueous solution of an organic solvent can be used. As the rinse liquid, water is preferable. A method of rinsing the coating film is not particularly limited. Typically, the rinse liquid is brought into contact with the coating film by the same method a the coating method described above to rinse the coating film.

Before the rinsing is performed, part or the whole of the solvent (S) contained in the coating film may be removed by heating of the coating film. When the coating film is heated, a reaction for forming a covalent bond between the resin (A) in the coating film and the surface of the treatment target can be facilitated, and thus it is easy to more firmly bond the coating formed after the rinsing to the surface of the substrate. A heating temperature is not particularly limited as long as the treatment target and the resin (A) are prevented from being degraded or decomposed. As a typical heating temperature, a temperature which is about 50° C. or more and 200° C. or less is mentioned. A heating time is not particularly limited, and the heating time is, for example, 5 seconds or more and 1 hour or less and is preferably 10 seconds or more and 10 minutes or less.

The film thickness of the coating obtained after the rinsing is not particularly limited as long as the film thickness is 10 nm or less and a desired surface treatment effect is obtained. The film thickness of the coating is more preferably 0.1 nm or more and 10 nm or less, is more preferably 0.1 nm or more and 8 nm or less, is further preferably 0.5 nm or more and 5 nm or less, and is particularly preferably 0.5 nm or more and 3 nm or less.

The thickness of the coating can be prepared by adjusting the concentration of the solid content of the surface treatment liquid, the film thickness of the coating film formed in the coating step, the amount of rinse liquid used, the type of rinse liquid, the temperature of the rinse liquid, and the like.

After the rinsing, the treatment target is dried as necessary, and thereafter the treatment target is suitably used for various applications, <Surface Treatment Liquid>

The surface treatment liquid contains the resin (A) and the solvent (S) described above. In the following discussion, arbitrary ingredients, essential ingredients, and the like of the surface treatment liquid will be described.

[Resin (A)]

The resin (A) includes the constituent unit (a1) derived from the N-substituted (meth) acrylamide having a hydrophilic group. Preferably, the resin (A) further includes the constituent unit (a2) derived from the (meth) acrylamide in terms of ease of the formation of the network by hydrogen bonds described previously. The resin (A) includes the reactive silyl group in at least one of the molecular chain terminals.

(Constituent Unit (a1))

In order to provide hydrophilicity to the surface of the treatment target by the surface treatment, the resin (A) includes the constituent unit (a1) derived from the N-substituted (meth) acrylamide having a hydrophilic group. The hydrophilic group described above is not particularly limited as long as it is generally recognized as a hydrophilic group by a person skilled in the art, Specific examples of the hydrophilic group include a primary amino group, a secondary amino group, a carboxy group, a phenolic hydroxyl group, a sulfonic acid group, polyoxyalkylene groups (for example, a polyoxyethylene group, a polyoxypropylene group, and a polyoxyalkylene group in which an oxyethylene group and an oxypropylene group are block-bonded or randomly bonded), an alcoholic hydroxyl group, and the like.

A cationic group formed with an anion moiety and a cation moiety that can be bonded to the resin (A) is also preferable as the hydrophilic group. Examples of the cation moiety constituting the cationic group include a nitrogen-containing cation moiety, a sulfur-containing cation moiety, an iodine-containing cation moiety, a phosphorus-containing cation moiety and the like.

Anions constituting the anion moiety are not particularly limited. The valency of the anion is not particularly limited, and a monovalent anion or a divalent anion is preferable, and a monovalent anion is more preferable. Suitable examples of the monovalent anion as the anion moiety include a halide ion, a hydroxide ion, a nitrate ion, various types of organic acid ions derived from organic carboxylic acid or organic sulfone acid, and the like. Among them, a halide ion is preferable, a chloride ion, bromide ion, an iodide ion, and a fluoride ion are more preferable, a chloride ion and a bromide ion are further preferable, and a chloride ion is particularly preferable.

Preferable examples of the cationic group include a group including a quaternary ammonium salt group, a group including a salt of a nitrogen-containing aromatic heterocyclic group, a group including a sulfonium salt group, a group including an iodonium salt group, a group including a phosphonium salt group, and the like. Among these cationic groups, the group including a quaternary ammonium salt group is preferable in terms of ease of introduction into the resin (A), a high hydrophilic effect, and the like.

As the quaternary ammonium salt group serving as the cationic group, a group represented by formula (I) below is preferable.

$$-R^{a14}-N^+R^{11}R^{12}R^{a13}-X^{13} \quad (1)$$

(in formula (I), $R^{11}$, $R^{12}$, and $R^{13}$ are an alkyl group which is each independently bonded to $N^+$ and has 1 or more and 4 or less carbon atoms, two of $R^{11}$, $R^{12}$, and $R^{13}$ may be bonded to each other so as to form a ring, $R^{14}$ is an alkylene group which has 1 or more and 4 or less carbon atoms, and $X^-$ is a monovalent anion).

The alkyl group serving as $R^{11}$, $R^{12}$, and $R^{13}$ and having 1 or more and 4 or less carbon atoms may be linear or branched and is preferably linear. Suitable specific examples of $R^{11}$, $R^{12}$, and $R^{13}$ include a methyl group, an ethyl group, an n-propyl group, and an n-butyl group.

The alkylene group serving as $R^{14}$ and having 1 or more and 4 or less carbon atoms may be linear or branched and is preferably linear. Suitable specific examples of $R^{14}$ include a methylene group, an ethane-1,2-diyl group, a propane-1,3-diyl group and a butane-1,4-diyl group.

Suitable examples of $X^-$ are the same as those of the suitable examples of the anions constituting the anion moiety described above.

A monomer which provides the constituent unit (a1) is not particularly limited as long as the monomer is an N-substituted (meth) acrylamide having a hydrophilic group. As the N-substituted (meth) acrylamide having the hydrophilic group, a compound represented by formula (A1) below is preferable:

$$CH_2=CR^2-CO-NH-R^1 \quad (A1)$$

(in formula (A1), $R^1$ represents an alkyl group which is substituted with one or more groups selected from a group consisting of an amino group, a sulfonic acid group, and a hydroxyl group and has 1 or more and 4 or less carbon atoms, and $R^2$ represents a hydrogen atom or a methyl group).

Suitable specific examples of $R^1$ include the following groups.
[Chem. 1]
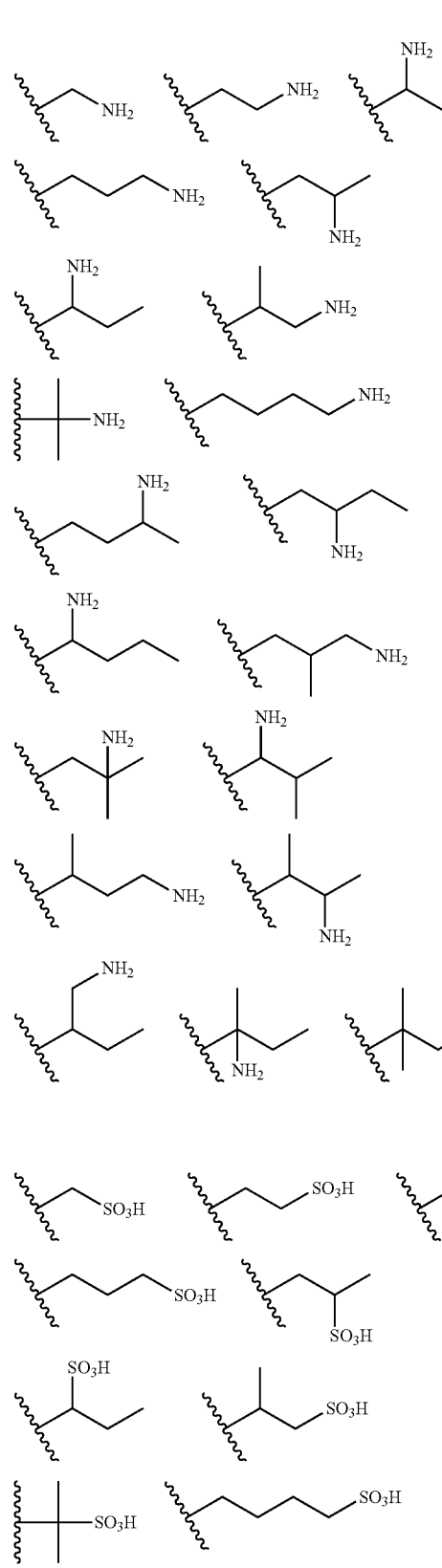
[Chem. 2]
[Chem. 3]
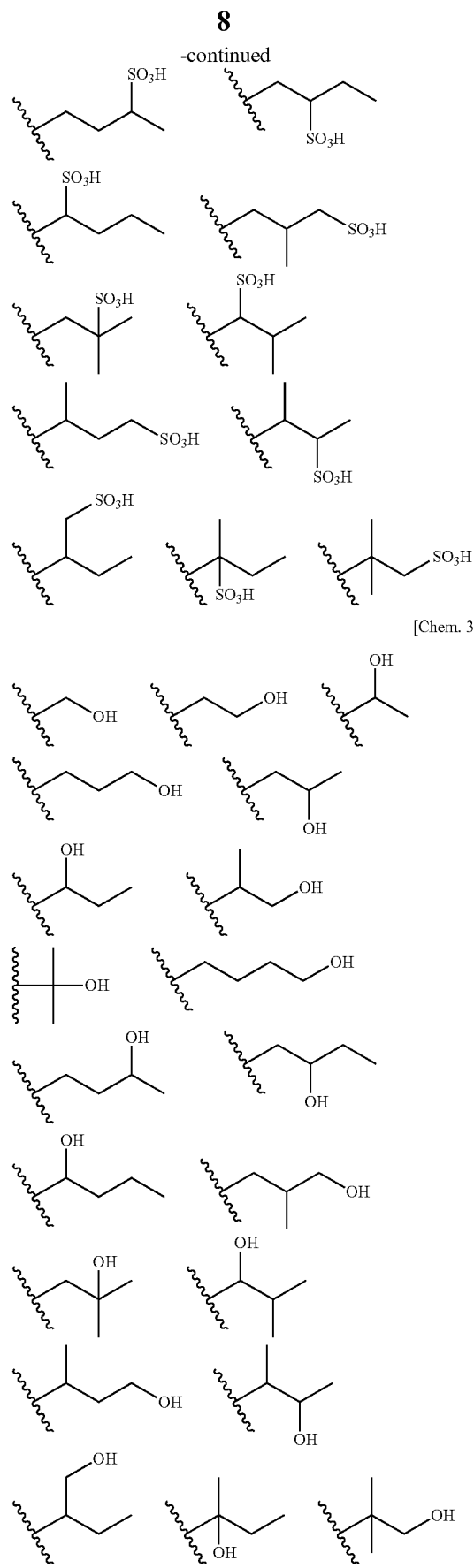

A ratio of the constituent unit (a1) to all of the constituent units of the resin (A) is not particularly limited as long as the desired surface treatment effect is obtained. For example, the ratio of the constituent unit (a1) to all of the constituent units of the resin (A) is preferably 5 mol % or more and 99 mol % or less. Since a hydrophilic effect at the time of surface treatment is excellent and a coating excellent in durability is easily formed, the ratio of the constituent unit (a1) to all of the constituent units of the resin (A) is preferably 50 mol % or more and 99 mol % or less, is more preferably 60 mol % or more and 98 mol % or less, is further preferably 70 mol % or more and 97 mol % or less, and is particularly preferably 80 mol % or more and 96 mol % or less.

(Constituent Unit (a2))

The resin (A) may include the constituent unit (a2) which is a constituent unit derived from the (meth) acrylamide. Preferably, as described previously, the resin (A) includes the constituent unit (a2) in terms of ease of the formation of the network by hydrogen bonds described previously. A ratio of the constituent unit (a2) to all of the constituent units of the resin (A) is not particularly limited as long as the desired surface treatment effect is obtained, Since the hydrophilic effect at the time of surface treatment is excellent and the coating excellent in durability is easily formed, the ratio of the constituent unit (a2) to all of the constituent units of the resin (A) is preferably 1 mol % or more and 50 mol % or less, is more preferably 1 mol % or more and 30 mol % or less, is further preferably 1 moles or more and 20 mol % or less, and is particularly preferably 1 mol % or more and 15 mol % or less.

Preferably, since both the hydrophilic effect of the treatment target and the durability of the coating are easily achieved at high levels, as a combination between the ratio of the constituent unit (a1) to all of the constituent units of the resin (A) and the ratio of the constituent unit (a2) thereto, the ratio of the constituent unit (a1) is 50 mol % or more and 99 mol % or less, and the ratio of the constituent unit (a2) is 1 mol % or more and 20 mol % or less.

(Other Constituent Unit (a3))

The resin (A) may include another constituent unit (a3) other than the constituent unit (a1) and the constituent unit (a2) as long as the object of the present invention is not inhibited.

Examples of the other constituent unit include constituent units derived from monomers such as methyl(meth)acrylate, ethyl(meth)acrylate, isopropyl(meth)acrylate, n-propyl(meth)acrylate, n-butyl(meth)acrylate, isobutyl(meth)acrylate, n-pentyl(meth)acrylate, isopentyl(meth)acrylate, phenyl(meth)acrylate, N,N-dimethyl(meth)acrylamide, N,N-diethyl(meth)acrylamide, N,N-di-n-propyl(meth)acrylamide, N,N-di-n-butyl(meth)acrylamide, N,N-di-n-pentyl(meth)acrylamide, styrene, α-methyl styrene, β-methyl styrene, o-methyl styrene, m-methyl styrene, p-methyl styrene, and chlorostyrene.

A constituent unit derived from a (meth)acrylic ester having a hydrophilic group is also preferable as the other constituent unit. As the (meth)acrylic ester having a hydrophilic group, mono(meth)acrylate of a polyalkylene glycol such as polyethylene glycol or polypropylene glycol and (meth)acrylate of a monoalkyl ether (for example, methyl ether or ethyl ether) of a polyalkylene glycol are mentioned.

A constituent unit which is represented by formula (A2) below and is derived from the (meth)acrylic ester having a hydrophilic group is also preferable as the other constituent unit.

$$CH_2=CR^2-CO-O-R^1 \quad (A2)$$

(in formula (A2), $R^1$ represents an alkyl group which is substituted with one or more groups selected from a group consisting of an amino group, a sulfonic acid group, and a hydroxyl group and has 1 or more and 4 or less carbon atoms, and $R^2$ represents a hydrogen atom or a methyl group). Suitable specific examples of $R^1$ are the same as the suitable specific examples of R' in formula (A1).

A ratio of the other constituent unit (a3) to all of the constituent units of the resin (A) is not particularly limited as long as the desired surface treatment effect is obtained. The amount of the other constituent unit (a3) with respect to all of the constituent units of the resin (A) is preferably the remaining amount obtained by subtracting the amount of constituent unit (a1) and the amount of constituent unit (a2) from the amount of all constituent units.

(Terminal Group)

In at least one of the molecular chain terminals of the resin (A), the terminal group which includes a silanol group and/or a reactive silyl group having a group that generates a silanol group by hydrolysis is bonded. Hence, the resin (A) reacts with the surface of the treatment target to form a covalent bond, and thus a coating is formed which is firmly bonded to the surface of the treatment target.

The terminal group includes one or more reactive silyl groups described above. As the reactive silyl group, a group represented by formula (II) below is preferable:

$$-SiR^{a2}_a R^{a3}_{3-a} \quad (II)$$

(in formula (II), $R^{a2}$ represents a hydroxyl group, an alkoxy group having 1 or more and 4 or less carbon atoms, or a halogen atom, $R^{a3}$ represents a hydrocarbon group which may include a substituent and has 1 or more and 10 or less carbon atoms, and a represents 2 or 3).

The reactive silyl group represented by formula (II) includes two or three silanol groups (hydroxyl groups) or groups (alkoxy groups and halogen atoms) to generate silanol groups by hydrolysis. Hence, when the surface treatment liquid which contains the resin (A) having the reactive silyl group represented by formula (II) described above is used to perform the surface treatment, not only does the reactive silyl group react with the surface of the treatment target, but also a condensation reaction occurs between the reactive silyl groups which are adjacently present on the surface of the treatment target, Consequently, in the coating, a network of siloxane bonds which is extended along the surface of the treatment target is formed, and thus a firm coating which is unlikely to be separated from the surface of the treatment target is easily formed.

Examples of the halogen atom serving as $R^{a2}$ include a chlorine atom, a bromine atom, an iodine atom, and the like, and a chlorine atom is preferable. Suitable examples of the alkoxy group serving as $R^{a3}$ include a methoxy group, an ethoxy group, an n-propyloxy group, an isopropyloxy group, and an n-butyloxy group, and a methoxy group and an ethoxy group are more preferable.

As the hydrocarbon group serving as $R^{a3}$, an alkyl group, an aralkyl group, or an aryl group is preferable. When $R^{a3}$ is an alkyl group, the number of carbon atoms thereof is preferably 1 or more and 6 or less, is more preferably 1 or more and 4 or less, and is preferably 1 or 2. Suitable examples of the alkyl group when $R^{a3}$ is an alkyl group include a methyl group, an ethyl group, an n-propyl group, an isopropyl group, and an n-butyl group, and a methyl group and an ethyl group are more preferable. As the aralkyl group, a benzyl group and a phenethyl group are preferable.

As the aryl group, a phenyl group, a naphthalen-1-yl group, and a naphthalen-2-yl group are preferable, and a phenyl group is more preferable.

As suitable examples of the reactive silyl group represented by formula (II) described above, a trimethoxysilyl group, a triethoxysilyl group, a tri-n-propyloxysilyl group, a methyldimethoxysilyl group, an ethyldimethoxysilyl group, a methyldiethoxysyl group, and an ethyldiethoxysilyl group are preferable, and a trimethoxysilyl group and a triethoxysilyl group are more preferable.

As the terminal group including the reactive silyl group represented by formula (II) described above, for example, in terms of ease of introduction into the resin (A), a group represented by formula (A-I) below is preferable:

(A-I)

(in formula (A-I), $R^{a1}$ represents a divalent hydrocarbon group having 1 or more and 20 or less carbon atoms, and $R^{a2}$, $R^{a3}$, and a are respectively the same as $R^{a2}$, $R^{a3}$, and a in formula (II)).

The terminal group represented by formula (A-I) described above is introduced into the resin (A) by producing a so-called thiol-ene reaction between a mercapto compound represented by formula (A-II) below and a terminal vinyl group of a (meth)acrylic resin which essentially includes the constituent unit (a1) described above, which includes, as necessary, the constituent unit (a2) and/or the constituent unit (a3) and is included in the precursor of the resin (A):

(A-II)

(in formula (A-II), $R^{a1}$ to $R^{a3}$ and a are respectively the same as $R^{a1}$ to $R^{a3}$ and a in formula (A-I)).

In formula (A-I) and formula (A-II) described above, the number of carbon atoms in the divalent hydrocarbon group serving as $R^{a1}$ is preferably 1 or more and 10 or less, is more preferably 1 or more and 6 or less, and is particularly preferably 2 or more and 4 or less. Examples of the divalent hydrocarbon group serving as $R^{a1}$ include an alkylene group, an arylene group, and a group obtained by combining an alkylene group and an arylene group, and an alkylene group is preferable. Suitable specific examples of the alkylene group serving as $R^{a1}$ include a methylene group, an ethane-1,2-diyl group, a propane-1,3-diyl group, a propane-1,2-diyl group, a butane-1,4-diyl group, a pentane-1,5-diyl group, a hexane-1,6-diyl group, a heptane-1,7-diyl group, an octane-1,8-diyl group, a nonane-1,9-diyl group, and a decane-1,10-diyl group.

Suitable examples of the mercapto compound represented by formula (A-II) include (2-mercaptoethyl) trimethoxysilane, (2-mercaptoethyl) triethoxysilane, (2-mercaptoethyl) methyldimethoxysilane, (2-mercaptoethyl) ethyldimethoxysilane, (2-mercaptoethyl) methyldiethoxysilane, (2-mercaptoethyl) ethyldiethoxysilane, (3-mercaptopropyl) trimethoxysilane, (3-mercaptopropyl) triethoxysilane, (3-mercaptopropyl) methyldimethoxysilane, (3-mercaptopropyl) ethyldimethoxysilane, (3-mercaptopropyl) methyldiethoxysilane, (3-mercaptopropyl) ethyldiethoxysilane, (4-mercaptobutyl) trimethoxysilane, (4-mercaptobutyl) triethoxysilane, (4-mercaptobutyl) methyldimethoxysilane, (4-mercaptobutyl) ethyldimethoxysilane, (4-mercaptobutyl) methyldiethoxysilane, and (4-mercaptobutyl) ethyldiethoxysilane.

The amount of the terminal group including the reactive silyl group in the resin (A) is not particularly limited as long as the object of the present invention is not inhibited. In terms of reactivity of the resin (A) with the surface of the treatment target, the amount of the terminal group including the reactive silyl group in the resin (A) with respect to all of the constituent units of the resin (A) is preferably 0.1 mol % or more and 30 mol % or less, is more preferably 1 mol % or more and 20 mol % or less, and is further preferably 1 mol % or more and 10 mol % or less.

The resin (A) described above can be prepared by polymerizing, according to a known method, a monomer for providing the constituent unit (a1) and, as necessary, a monomer for providing the constituent unit (a2), and/or a monomer for providing the constituent unit (a3) and thereafter introducing, according to a known method, the terminal group including the reactive silyl group into the terminal of the obtained polymer.

The concentration of the resin (A) in the surface treatment liquid is not particularly limited. Since, for example, a thin coating whose film thickness is uniform is easily formed and the self-condensation of the terminal groups in the resin (A) is easily prevented, the concentration of the resin (A) in the surface treatment liquid is preferably 0.1 mass % or more and 10 mass % or less, is more preferably 0.1 mass % or more and 7 mass % or less, is further preferably 0.2 mass % or more and 5 mass % or less, and is particularly preferably 0.5 mass- or more and 2 mass % or less.

[Solvent (S)]

The surface treatment liquid contains the solvent (S). The solvent (S) may be water, an organic solvent, or an aqueous solution of an organic solvent. As the solvent (5), water is preferable in terms of the solubility of the resin (A), the safety and the cost reduction of the operation of the hydrophilic treatment, and the like. As a suitable example of the organic solvent used as the solvent (S), alcohol is mentioned. As the alcohol, an aliphatic alcohol is mentioned, and alcohol having 1 or more and 3 or less carbon atoms is preferable. Specific examples thereof include methanol, ethanol, n-propyl alcohol, and isopropyl alcohol (IPA), and methanol, ethanol, and isopropyl alcohol are preferable. One type or a combination of two or more types of alcohols described above may be used.

The content of water in the solvent (S) is preferably 80 mass % or more is more preferably 90 mass % or more, and is particularly preferably 100 mass %.

The surface treatment liquid can include an arbitrary polymerization initiator. As the polymerization initiator, for example, an azo polymerization initiator is mentioned. Examples of the polymerization initiator described above include 2,2'-azobis (2-methylpropionamidine) dihydrochloride (dihydrochloride), 2,2'-azobis [2-(phenylamidino) propane]dihydrochloride, 2,2'-azobis {2-[N-(4-chlorophenyl) amidino]propane}dihydrochloride, 2,2'-azobis {2-[N-(4-hydroxyphenyl) amidino]propane}dihydrochloride, 2,2'-azobis [2-(N-benzylamidino) propane]dihydrochloride, 2,2'-azobis [2-(N-allylamidino) propane]dihydrochloride, 2,2'-azobis (2-amidinopropane) dihydrochloride, 2,2'-azobis {2-[N-(4-hydroxyethyl) amidino]propane}dihydrochloride, 2,2-azobis [2-(5-methyl-2-imidazolin-2-yl) propane]dihydrochloride, 2,2-azobis [2-(2-imidazolin-2-yl) Propane]dihydrochloride, 2,2-azobis [2-(4,5,6,7-tetrahydro-1H-1,3-diazepin-2-yl) propane]dihydrochloride, 2,2-azobis [2-(3,4,5,6-tetrahydropyrimidin-2-yl) propane]dihydrochloride, 2,2-azobis [2-(5-hydroxy-3,4,5,6-tetrahydropyrimidin-2-yl) propane]dihydrochloride, 2,2-azobis {2-[1-(2-hydroxyethyl)-2-imidazolin-2-yl]propane}dihydrochloride, and 2,2-azobis [2-(2-imidazoline-2-yl) propane]. These polymerization initiators may be used singly, or two or more types thereof may be combined so as to be used. The content of the polymerization initiator in relation to the total mass of the resin (A), that is, 100 parts by mass, is preferably 0.01 to 3.0 parts by mass, is more preferably 0.05 to 2.0 parts by mass, is further preferably 0.1 to 1.0 parts by mass, and is particularly preferably 0.1 to 0.5 parts by mass.

[Other Ingredients]

The surface treatment liquid may contain various additives as long as the object of the present invention is not inhibited. Examples of the additive described above include a pH adjustment agent, a thermal polymerization inhibitor, a photopolymerization inhibitor, an antioxidant, an ultraviolet light absorber, a coloring agent, an antifoaming agent, a viscosity adjustment agent, and the like. The amounts of these additives used are determined as necessary with consideration given to the normally used amounts of these additives.

The pH of the surface treatment liquid described above is 4 or less. Hence, when the pH of a liquid prepared by dissolving the resin (A) in the solvent (S) exceeds 4, a pH adjustment agent is added to the surface treatment liquid, and thus the pH of the surface treatment liquid is adjusted to be 4 or less. As the pH adjustment agent, for example, a known acid such as hydrochloric acid, sulfuric acid, or nitric acid can be used.

<<Hydrophilic Treatment Method According to Second Aspect>>

A hydrophilic treatment method according to a second aspect is the same as the hydrophilic treatment method according to the first aspect except that the resin (A) essentially includes the constituent unit (a1) and the constituent unit (a2), such that a ratio of the constituent unit (a1) to all of the constituent units of the resin (A) is 50 mol % or more and 99 mol % or less and a ratio of the constituent unit (a2) to all of the constituent units of the resin (A) is 1 mol % or more and 20 mold or less, and that the film thickness of the coating formed with the surface treatment liquid is not limited.

As described above, the thickness of the coating formed in the hydrophilic treatment method according to the second aspect is not limited. For example, the thickness of the coating formed in the hydrophilic treatment method according to the second aspect is preferably 50 nm or less, is more preferably 20 nm or less, and is particularly preferably the same as the thickness in the hydrophilic treatment method according to the first aspect.

<<Surface Treatment Liquid According to Third Aspect>>

A surface treatment liquid according to a third aspect is the surface treatment liquid used in the hydrophilic treatment method according to the first aspect. The surface treatment liquid according to the third aspect is the same as the surface treatment liquid described in the hydrophilic treatment method according to the first aspect.

<<Surface Treatment Liquid According to Fourth Aspect>>

A surface treatment liquid according to a fourth aspect is the same as the surface treatment liquid described in the hydrophilic treatment method according to the first aspect except that the resin (A) essentially includes the constituent unit (a1) and the constituent unit (a2) such that the ratio of the constituent unit (a1) to all of the constituent units of the resin (A) is 50 mol % or more and 99 mol % or less and the ratio of the constituent unit (a2) to all of the constituent units of the resin (A) is 1 mol % or more and 20 mol % or less.

EXAMPLES

Although the present invention will be more specifically described below using Examples, the scope of the present invention is not limited to these Examples.

Examples 1, 2, and Comparative Examples 1, 2

Monomers, polymerization initiators, and mercapto compounds for terminal-group introduction of types and amounts described in table 1 were individually added to the amounts of water described in table 1; thereafter, radical polymerization was performed at 80° C. for 4 hours and thus, as aqueous solutions of resins, resin liquids 1 to 4 described in table 1 were obtained. The resin liquids of the types described in table 1 were diluted with water so as to have a concentration described in table 2, and thus surface treatment liquids were obtained. After being diluted, the surface treatment liquid of Comparative Example 1 was adjusted with NaOH so as to have a pH of 7.0.

Raw materials for resin synthesis described in table 1 are as follows.

A-1: 2-acrylamido-2-methylpropane sulfonic acid
A-2: acrylamido
A-3: acrylic acid (polyethylene glycol) methyl ether (molecular weight: 480)
B-1: 2,2'-azobis [2-(2-imidazolin-2-yl) propane]
B-2: 2,2'-azobis (2-methylpropionamidine) dihydrochloride
C-1: (3-mercaptopropyl) trimethoxysilane
C-2: 2-aminoethanethiol The surface treatment liquids of Examples 1 and 2 and Comparative Example 2 which were obtained were used, and thus the evaluations of hydrophilic treatment were performed according to the methods of evaluation 1 and evaluation 2 below. The results of these evaluations are shown in table 2. Since in the surface treatment liquid of Comparative Example 1, the resin was remarkably precipitated, the evaluation of hydrophilic treatment was not performed. Since in the surface treatment liquid of Comparative Example 2, satisfactory hydrophilic treatment was not confirmed under a condition in which friction was not produced, the evaluation of the contact angle of water after friction was not performed.

<Evaluation 1>

As a treatment target, a silicon wafer was used in which a natural oxide film on its surface was removed with a hydrofluoric acid aqueous solution. The silicon wafer was immersed in the surface treatment liquid at room temperature for one minute. The silicon wafer was lifted up from the surface treatment liquid and was thereafter subjected to heating treatment at 180° C. for 5 minutes. The silicon wafer was cooled to room temperature and was thereafter rinsed with pure water. The silicon wafer after being rinsed was dried, and thereafter the film thickness of a coating formed on the surface of the silicon wafer was measured by spectroscopic ellipsometry. Then, on the silicon wafer on which the treatment described above was performed and the silicon wafer on which, after the surface treatment, a 2 cm square of Scotch-Brite antibacterial urethane (made by 3M Corporation) was used to perform a scratch resistance test of 10 round trips with a load of 2 kg, the evaluations of the contact angle of water were performed according to the following method, (Contact Angle Evaluation)

With a DropMaster 700 (made by Kyowa Interface Science Co., Ltd.), pure water droplets (2.0 μL) were dropped on the surface of the silicon wafer subjected to the surface treatment, and as contact angles 10 seconds after dropping, contact angles of the water were measured. The average values of the contact angles of the water at three points on the silicon wafer are described in table 2.

<Evaluation 2>

The evaluations of the contact angles of water were performed in the same manner as in evaluation 1 except that the silicon wafer was lifted up from the surface treatment liquid, that thereafter the silicon wafer in a wet state with the surface treatment liquid was rinsed with pure water and that the silicon wafer was then dried by heating at 80° C. for 5 minutes.

TABLE 1

|  |  | Resin liquid 1 | Resin liquid 2 | Resin liquid 3 | Resin liquid 4 |
|---|---|---|---|---|---|
| Monomer Upper section: Parts by mass Lower section: Ratio (mol %) | A-1 | 20 (89.1) | 17 (84.2) | 20 (89.1) | — |
|  | A-2 | 0.84 (10.9) | 0.74 (12.0) | 0.84 (10.9) | 20 (100.0) |
|  | A-3 | — | 2.39 (3.8) | — | — |
| Polymerization initiator (Parts by mass) | B-1 | 0.01 | 0.05 | 0.01 | — |
|  | B-2 | — | — | — | 0.2 |
| Mercapto compound for terminal-group introduction (Parts by mass) | C-1 | 0.01 | 0.39 | 0.01 | — |
|  | C-2 | — | — | — | 0.2 |
| Water (Parts by mass) |  | 79.15 | 79.37 | 79.15 | 79.6 |

TABLE 2

|  |  | Example1 | Example2 | Comparative Example1 | Comparative Example2 |
|---|---|---|---|---|---|
| Surface treatment liquid | Resin liquid | Resin liquid 1 | Resin liquid 2 | Resin liquid 3 | Resin liquid 4 |
|  | Concentration (mass %) | 1 | 1 | 1 | 1 |
|  | pH | 2 | 2 | 7 | 2 |
| Evaluation1 Rinsing after heating at 180° C. | Film thickness (nm) | 2 | 3 | — | — |
|  | Water contact angle (Initial) | <5° | <5° | — | 76° |
|  | Water contact angle (After friction) | <5° | <5° | — | — |
| Evaluation2 Rinsing without heating | Film thickness (nm) | 2 | 2 | — | — |
|  | Water contact angle (Initial) | <5° | <5° | — | 76° |
|  | Water contact angle (After friction) | <5° | <5° | — | — |

It is found from Examples 1 and 2 that when the surface treatment liquid which includes the constituent unit (a1) derived from the N-substituted (meth) acrylamide having the hydrophilic group and the resin (A) having the terminal group including the reactive silyl group, and in which the pH thereof is 4 or less is used, an extremely thin coating having a film thickness of 10 nm or less can be formed, and the surface of the treatment target can be made satisfactorily hydrophilic. It is found from table 2 and evaluation 2 on the surface treatment liquids of Examples 1 and 2 that when the surface treatment liquid which satisfies the predetermined requirements described above is used, even if the surface of the coating is rubbed, the hydrophilic effect is not inhibited. In other words, it is found from table 2 and evaluation 2 on the surface treatment liquids of Examples 1 and 2 that when the surface treatment liquid which satisfies the predetermined requirements described above is used, even if the film thickness is so extremely thin as to be 10 nm or less, it is possible to form the coating which is prevented from being easily separated from the surface of the treatment target.

It is found from Comparative Example 1 that when the pH of the surface treatment liquid exceeds 4, the constituent unit (a1) derived from the N-substituted (meth) acrylamide having the hydrophilic group and the resin (A) having the terminal group including the reactive silyl group are unlikely to be dissolved in the surface treatment liquid.

In the resin contained in the surface treatment liquid of Comparative Example 2, 2-aminoethanethiol was used to introduce the terminal group, Hence, the resin described above does not include the reactive silyl group in the terminal group. Thus, it is found that when the surface treatment liquid of Comparative Example 2 is used to perform the hydrophilic treatment, the coating is unlikely to adhere to the surface of the treatment target, and thus the desired hydrophilic effect is unlikely to be obtained in a state before the friction.

What is claimed is:

1. A hydrophilic treatment method of using a surface treatment liquid comprising a resin (A) and a solvent (S) to make a surface of a treatment target hydrophilic, the hydrophilic treatment method comprising:
    forming a coating film by coating the surface of the treatment target with the surface treatment liquid; and
    forming a coating having a film thickness of 10 nm or less on the surface of the treatment target by rinsing the coating film with a rinse liquid,
    wherein the resin (A) comprises a constituent unit (a1) derived from an N-substituted (meth) acrylamide having a hydrophilic group, a constituent unit (a2) derived from a (meth) acrylamide, and a constituent unit having a hydrophilic group (a3) other than the constituent unit (a1) and the constituent unit (a2),
    the constituent unit having the hydrophilic group (a3) comprises a constituent unit derived from at least one selected from the group consisting of a mono(meth) acrylate of a polyalkylene glycol and a (meth)acrylate of a monoalkyl ether of a polyalkylene glycol,
    in at least one of the molecular chain terminals of the resin (A), a terminal group which comprises a silanol group and/or a reactive silyl group having a group to generate a silanol group by hydrolysis is bonded,
    a ratio of the constituent unit (a2) to all of the constituent units of the resin (A) is 1 mol % or more and 20 mol % or less, and
    a pH of the surface treatment liquid is 4 or less.

2. The hydrophilic treatment method according to claim 1, wherein a ratio of the constituent unit (a1) to all of the constituent units of the resin (A) is 50 mol % or more and 99 mol % or less.

3. A hydrophilic treatment method of using a surface treatment liquid comprising a resin (A) and a solvent (S) to make a surface of a treatment target hydrophilic, the hydrophilic treatment method comprising:

forming a coating film by coating the surface of the treatment target with the surface treatment liquid; and forming a coating on the surface of the treatment target by rinsing the coating film with a rinse liquid, wherein the resin (A) includes a constituent unit (a1) derived from an N-substituted (meth) acrylamide having a hydrophilic group, a constituent unit (a2) derived from a (meth) acrylamide, and a constituent unit having a hydrophilic group (a3) other than the constituent unit (a1) and the constituent unit (a2), the constituent unit having the hydrophilic group (a3) comprises a constituent unit derived from at least one selected from the group consisting of a mono(meth) acrylate of a polyalkylene glycol and a (meth)acrylate of a monoalkyl ether of a polyalkylene glycol, in at least one of the molecular chain terminals of the resin (A), a terminal group which comprises a silanol group and/or a reactive silyl group having a group to generate a silanol group by hydrolysis is bonded, a ratio of the constituent unit (a1) to all of the constituent units of the resin (A) is 50 mol % or more and 99 mol % or less, and a ratio of the constituent unit (a2) to all of the constituent units of the resin (A) is 1 mol % or more and 20 mol % or less, and a pH of the surface treatment liquid is 4 or less.

4. The hydrophilic treatment method according to claim 1, wherein the constituent unit (a1) is a constituent unit derived from a monomer represented by formula (A1) below:

$$CH_2=CR^2—CO—NH—R^1 \quad (A1)$$

wherein $R^1$ represents an alkyl group which is substituted with one or more groups selected from a group consisting of an amino group, a sulfonic acid group, and a hydroxyl group and has 1 or more and 4 or less carbon atoms, and $R^2$ represents a hydrogen atom or a methyl group.

5. The hydrophilic treatment method according to claim 3, wherein the constituent unit (a1) is a constituent unit derived from a monomer represented by formula (A1) below:

$$CH_2=CR^2—CO—NH—R^1 \quad (A1)$$

wherein $R^1$ represents an alkyl group which is substituted with one or more groups selected from a group consisting of an amino group, a sulfonic acid group, and a hydroxyl group and has 1 or more and 4 or less carbon atoms, and $R^2$ represents a hydrogen atom or a methyl group.

6. The hydrophilic treatment method according to claim 1, wherein the terminal group is a group represented by formula (A-I) below:

$$—S—R^{a1}—SiR^{a2}_a R^{a3}_{3-a} \quad (A-I)$$

wherein $R^{a1}$ represents a divalent hydrocarbon group having 1 or more and 20 or less carbon atoms, $R^{a2}$ represents a hydroxyl group, an alkoxy group having 1 or more and 4 or less carbon atoms, or a halogen atom, $R^{a3}$ represents a hydrocarbon group which may include a substituent and has 1 or more and 10 or less carbon atoms, and a represents 2 or 3.

7. The hydrophilic treatment method according to claim 3, wherein the terminal group is a group represented by formula (A-I) below:

$$—S—R^{a1}—SiR^{a2}_a R^{a3}_{3-a} \quad (A-I)$$

wherein $R^{a1}$ represents a divalent hydrocarbon group having 1 or more and 20 or less carbon atoms, $R^{a2}$ represents a hydroxyl group, an alkoxy group having 1 or more and 4 or less carbon atoms, or a halogen atom, $R^{a3}$ represents a hydrocarbon group which may include a substituent and has 1 or more and 10 or less carbon atoms, and a represents 2 or 3.

* * * * *